United States Patent [19]

Wang et al.

[11] Patent Number: 5,222,234
[45] Date of Patent: Jun. 22, 1993

[54] COMBINING SEARCH CRITERIA TO FORM A SINGLE SEARCH AND SAVING SEARCH RESULTS FOR ADDITIONAL SEARCHES IN A DOCUMENT INTERCHANGE SYSTEM

[75] Inventors: Diana S. Wang, Trophy Club; Francis J. Kastelic, Austin, both of Tex.

[73] Assignee: International Business Machines Corp., Armonk, N.Y.

[21] Appl. No.: 821,837

[22] Filed: Feb. 10, 1992

Related U.S. Application Data

[63] Continuation of Ser. No. 458,061, Dec. 28, 1989, abandoned.

[51] Int. Cl.$^5$ .............................................. G06F 15/40
[52] U.S. Cl. .................................... 395/600; 364/DIG. 2; 364/963; 364/974.6
[58] Field of Search ................................................ 395/600

[56] References Cited

U.S. PATENT DOCUMENTS

| | | | |
|---|---|---|---|
| 3,909,796 | 9/1975 | Kitamura | 364/900 |
| 3,916,387 | 10/1975 | Woodrum | 364/200 |
| 4,255,796 | 3/1981 | Gabbe et al. | 364/900 |
| 4,384,325 | 5/1983 | Slechta, Jr. et al. | 364/200 |
| 4,468,728 | 8/1984 | Wang | 364/200 |
| 4,504,907 | 3/1985 | Manning et al. | 364/200 |
| 4,677,550 | 6/1987 | Ferguson | 364/200 |
| 4,799,149 | 1/1989 | Wolf | 364/200 |
| 4,819,160 | 4/1989 | Tanka et al. | 364/200 |
| 4,823,306 | 4/1989 | Barbic et al. | 364/900 |
| 4,833,597 | 5/1989 | Wakayama et al. | 364/200 |
| 4,876,643 | 10/1989 | McNeill et al. | 364/200 |
| 4,893,232 | 1/1990 | Shimaoka et al. | 364/200 |
| 4,897,782 | 1/1990 | Bennett et al. | 364/200 |

OTHER PUBLICATIONS

"APS Text Search and Retrieval Classroom Manual"; PRC; May 87/Apr. 89; pp. i, ii, 1-9 to 1-16, Sections 2, 4, 5, 7 and B.

"APS Classified & Image Retrieval Student Manual"; Sections 1-10 and A; date see APS Text.

"Pocket Guide to Dialog"; Dialog Information Service, Inc.; Nov. 1988.

"APS Text Search and Retrieval"; Planning Research Corp. May 1987, pp. 2(2) to 2-4, 2-38 to 2-39, 4-1 to 4-12, 4-26A to 4-26C, 5-1 to 5-8, i & x, 7-1 to 7-30.

Primary Examiner—Parshotam S. Lall
Assistant Examiner—Krisna Lim
Attorney, Agent, or Firm—David A. Mins, Jr.; James H. Barksdale

[57] ABSTRACT

A method of saving a search criteria and search results of a document search in a document interchange system having a plurality of shared libraries. The search criteria is stored in a Search Criteria Document appropriately encoded for the document interchange management system. The search results are saved in a Search Result Document. This Search Result Document may be reused or stored in another document such as a folder.

5 Claims, 10 Drawing Sheets

Search Criteria Document - Phrase Type

| Structure Name | Struct Type | Intro ducer | IDF/T | Order | Mult Occur | Exist Crite | Value Desc |
|---|---|---|---|---|---|---|---|
| IN Phrase | D | --- | ---- | N | 1 | Opt | - |
| In Group Prefix | L/pfx | LLIDF | C33A41 | Y | 1 | Req | - |
| Library | L | LLIDF | C33041 | --- | 1-n | Req | 1 |
| GCID | A | LT | 01 | --- | 1 | Req | - |
| Library name | A | LT | 02 | --- | 1 | Req | - |
| In Group Suffix | L/sfx | LLIDF | C33B41 | Y | 1 | Req | - |
| FROM Phase | D | --- | ---- | N | 1 | Opt | - |
| From Group Prefix | L/pfx | LLIDF | C32B41 | Y | 1 | Req | - |
| IDENTIFIED-DATA | A | LLIDF | C32042 C32048 | --- | 1-n | Exc | -_- |
| Search Group | D | -- | ---- | Y | 1 | Exc | - |
| Search Group Prefix | L/pfx | LLIDF | C34B41 | Y | 1 | Req | - |
| Search Filter | ---- | --- | ---- | --- | --- | Req | 6 |
| Search Group Suffix | L/sfx | LLIDF | C34C41 | Y | 1 | Req | - |
| From Group Suffix | L/sfx | LLIDF | C32C41 | Y | 1 | Req | - |
| WHERE Phrase | D | --- | ---- | N | 1 | Opt | - |
| Where Group Prefix | L/pfx | LLIDF | C33541 | Y | 1 | Req | - |
| Data Attributes | L | LLIDF | C70141 | Y | 1 | Opt | - |
| GCID | A | LT | 01 | Y | 1 | Req | 5 |
| Search Filter | ---- | --- | ---- | --- | --- | Exc | 6 |
| Where Group Suffix | L/sfx | LLIDF | C33641 | Y | 1 | Req | - |

```
COMMAND        OPERANDS
―――――――
SEARCH

[IDENTIFIED-DATA] (SEARCH CRITERIA)
               [, REFERENCED-DATA] (EXISTING SRD)

[, REFERENCED-DATA] (TO CONTEXT)

[, SEARCH-DOCUMENT-NAME]
               [, ON-BEHALF-USER]
               [, RETRIEVE-COUNT]
               [, DESCRIPTOR-CONTENT-DEFINITION]
               [, SEARCH-RESULT-DOCUMENT-CONTENT]
               [, TIME-LIMIT]
               [, SELECT-LIMIT]
```

*FIG. 3*

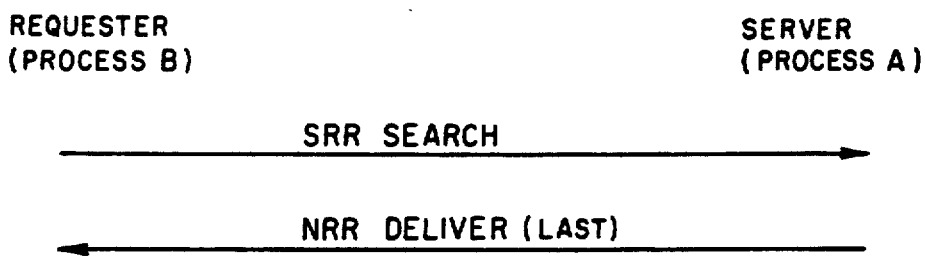

*FIG. 3A*

```
+ | <SEARCH FILTER> ::=  <CRITERIA ATOM>
+ |                    | <SEARCH FILTER> AND <SEARCH FILTER>
+ |                    | <SEARCH FILTER> OR <SEARCH FILTER>
+ |                    | WHERE PHRASE
```

*FIG. 5*

| OP VALUE | MINIMUM COMPARE DATA VALUE PARM(S) | MAXIMUM COMPARE DATA VALUE PARM(S) | PARAMETER TYPES SUPPORTED BIN CHAR ENUM |
|---|---|---|---|
| EQUAL | 1 | 1 | X  X  X |
| NOT EQUAL | 1 | 1 | X  X  X |
| GREATER THAN | 1 | 1 | X |
| GREATER THAN OR EQUAL TO | 1 | 1 | X |
| LESS THAN | 1 | 1 | X |
| LESS THAN OR EQUAL TO | 1 | 1 | X |
| IN | 2 | n | X  X |
| NOT IN | 2 | n | X  X |
| BETWEEN | 2 | 2 | X  X |
| NOT BETWEEN | 2 | 2 | X  X |
| LIKE | 1 | 1 | X*  X |
| ARE | 2 | n | X |

```
       LL        ID        F
     ┌──────┬────────┬────────┐
     │X'nnnn'│X'CA74'│ X'01' │
     └──────┴────────┴────────┘
     0      2        4
```

| PARAMETER | OCCURRENCE |
|---|---|
| DATE/TIME SEARCH EXECUTED | REQUIRED |
| TIME LIMIT | OPTIONAL |
| SELECT LIMIT | OPTIONAL |
| COUNT | REQUIRED |
| SEARCHED LIBRARIES | REQUIRED |
| EXCEPTION CODE | OPTIONAL |

*FIG. 7*

```
     LL       ID       F
  ┌──────┬────────┬──────┬──────┐
  │X'000D'│X'C7A5'│X'01'│ DTM  │
  └──────┴────────┴──────┴──────┘
  0      2        4     5      7
```

FIELD DESCRIPTIONS

THE DTM FIELD CONSISTS OF SEVEN SUBFIELDS OF DISCONTINUOUS BINARY VALUES IN THE FOLLOWING FORMAT.

FILE DATE TIME: = YYMDhmshs

WHERE: YY = 2-BYTE BINARY VALUE OF 4-DIGIT DECIMAL YEAR
(FOR EXAMPLE, 1980(10): X'07BC')

M = 1-BYTE BINARY VALUE OF 2-DIGIT DECIMAL MONTH
(FOR EXAMPLE, 1-12(10): X'01'-X'0C')

D = 1-BYTE BINARY VALUE OF 2-DIGIT DECIMAL DAY OF MONTH (FOR EXAMPLE, 1-31(10): X'01'-X'1F')

h = 1-BYTE BINARY VALUE OF 2-DIGIT DECIMAL HOURS
(FOR EXAMPLE, 0-23(10): X'00'-X'17')

m = 1-BYTE BINARY VALUE OF 2-DIGIT DECIMAL MINUTES
(FOR EXAMPLE, 0-59(10): X'00'-X'3B')

s = 1-BYTE BINARY VALUE OF 2-DIGIT DECIMAL SECONDS
(FOR EXAMPLE, 0-59(10): X'00'-X'3B')

hs = 1-BYTE BINARY VALUE OF 2-DIGIT DECIMAL HUNDREDTHS OF A SECOND
(FOR EXAMPLE, 0-99(10): X'00'-X'63')

| LL | ID | F | |
|---|---|---|---|
| X'nnnn' | X'C7A0' | X'01' | Time |
| 0 | 2 | 4 | 5  7 |

FIG. 10

| LL | ID | F | |
|---|---|---|---|
| X'nnnn' | X'C7A1' | X'01' | Select Limit |
| 0 | 2 | 4 | 5  9 |

FIG. 11

| LL | ID | F | |
|---|---|---|---|
| X'nnnn' | X'C7A2' | X'01' | Count |
| 0 | 2 | 4 | 5  9 |

FIG. 12

| LL | ID | F |
|---|---|---|
| X'nnnn' | X'C7A3' | X'41' |
| 0 | 2 | 4  5 |

| X'0601' | GCID | LT X'nn14' | LGRPID | LT X'nn15' | CTRYID | LT X'nn16' | NLNGID |
|---|---|---|---|---|---|---|---|
| 0 | 2 | | | | | | |

| LT X'nn02' | Default Library | X'nn03' | Other Library |
|---|---|---|---|
| 4 | 5 | | |

FIG. 13

| LL | ID | F | | | | |
|---|---|---|---|---|---|---|
| X'nnnn' | X'C7A4' | X'01' | X'nnnn' | X'C322' | X'01' | Exc |
| 0 | 2 | 4 | 5 | 7 | 9 | 10  v |

Document Descriptor Document Format

| Structure Name | Struct Type | Intro ducer | IDF/T | Order | Mult Occur | Exist Crite | Value Desc |
|---|---|---|---|---|---|---|---|
| SRD Sub-profile | L | LLIDF | CA7401 | Y | 1 | Req | 21 |
| SRD Sub-profile | L | LLIDF | CA7401 | Y | 1 | Con | 21 |
| Descriptors | D | --- | --- | Y | 1 | Opt | - |
| Descriptor Pfx | L/pfx | LLIDF | CA5441 | Y | 1 | Opt | - |
| Descriptor Entry | D | --- | --- | Y | 1-n | Opt | - |
| Descriptor Entry Pfx | L/pfx | LLIDF | CA5241 | Y | 1. | Req | - |
| Library | L | LLIDF | C33041 | Y | 1 | Opt | 1 |
| GCID | A | LT | 01 | --- | 1 | Req | - |
| Library name | A | LT | 02 | --- | 1 | Req | - |
| Library Assigned Document Name | L | LLIDF | C72041 | Y | 1 | Req | - |
| Date time | A | LT | 01 | --- | 1 | Req | - |
| Node ID | A | LT | 02 | --- | 1 | Req | - |
| Fully Qualified Unique Name | L | LLIDF | C37248 | Y | 1-n | Opt | 25 |
| GCID | A | LT | 01 | --- | 1-n | Opt | - |
| Name | A | LT | 02 | --- | 1-n | Opt | - |
| Search Rank | L | LLIDF | CA5641 | Y | 1 | Opt | - |
| Rank | A | LT | 01 | --- | 1 | Req | 18 |
| Search Rank | L | LLIDF | CA5641 | Y | 1 | Opt | 26 |
| Rank | A | LT | 01 | --- | 1 | Con | 18 |
| Model Objects | L | LLIDF | --- | Y | 1-n | Opt | 19 |
| Sub-model Objects | L | LLIDF | --- | Y | 1-n | Opt | 19 |
| Parameters | L | LLIDF | --- | Y | 1-n | Opt | 19 |
| Descriptor Entry Sfx | L/sfx | LLIDF | CA5341 | Y | 1-n | Req | - |
| Descriptor Sfx | L/sfx | LLIDF | CA5541 | Y | 1 | Opt | - |

*FIG. 14*

Search Result Document

| Structure Name | Struct Type | Intro ducer | IDF/T | Order | Mult Occur | Exist Crite | Value Desc |
|---|---|---|---|---|---|---|---|
| Search Data | D | --- | --- | Y | 1 | Req | - |
| Search Criteria Append Doc Pfx | L/pfx | LLIDF | CA5041 | Y | 1 | Req | - |
|   : see append document : | | | | | | | |
| Search Criteria Append Doc Sfx | L/sfx | LLIDF | CA5141 | Y | 1 | Req | - |
| Search Result | D | --- | --- | Y | 1 | Opt | - |
|   Search Result Pfx | L/pfx | LLIDF | CA5441 | Y | 1 | Opt | - |
|   Search Entry | D | --- | --- | Y | 1-n | Opt | - |
|     Search Entry Pfx | L/pfx | LLIDF | CA5241 | Y | 1 | Req | - |
|     Library | L | LLIDF | C33041 | --- | 1 | Opt | 1 |
|       GCID | A | LT | 01 | --- | 1 | Req | - |
|       Library name | A | LT | 02 | --- | 1 | Req | - |
|     Library Assigned Document Name | L | LLIDF | C72041 | --- | 1 | Req | - |
|       Date time | A | LT | 01 | --- | 1 | Req | - |
|       Node ID | A | LT | 02 | --- | 1 | Req | - |
|     Search Rank | L | LLIDF | CA5641 | --- | 1 | Opt | - |
|       Rank | A | LT | 01 | --- | 1 | Req | 18 |
|     Model Objects | L | LLIDF | --- | Y | 1-n | Opt | 19 |
|       Sub-model Objects | L | LLIDF | --- | Y | 1-n | Opt | 19 |
|         Parameters | L | LLIDF | --- | Y | 1-n | Opt | 19 |
|   Search Entry Sfx | L/sfx | LLIDF | CA5341 | Y | 1-n | Req | - |
|   Search Result Sfx | L/sfx | LLIDF | CA5541 | Y | 1 | Opt | - |
| Probe Data | D | --- | --- | Y | 1 | Opt | - |
|   Probe Pfx | L/pfx | LLIDF | | Y | 1 | Opt | - |
|     Probe Data - tbd | | | | | | | |
|   Probe Sfx | L/sfx | LLIDF | | Y | 1 | Opt | - |

*FIG. 15*

Search Criteria Document – Append Type

| Structure Name | Struct Type | Intro ducer | IDF/T | Order | Mult Occur | Exist Crite | Value Desc |
|---|---|---|---|---|---|---|---|
| IN Group | D | --- | --- | Y | 0-n | H | - |
|   IN Group Prefix | L/pfx | LUDF | C33A41 | Y | 1 | Req | - |
|     Library | L | LUDF | C33041 | --- | 1-n | Exc | 1 |
|       GCID | A | LT | 01 | --- | 1 | Req | - |
|       Library name | A | LT | 02 | --- | 1 | Req | - |
|     Using Name | L | LUDF | C31442 C31448 | --- | 1 | Exc | 2 |
|   Find Group | D | --- | --- | Y | 0-n | I | - |
|     Find Group Prefix | L/pfx | LUDF | C33C41 | Y | 1 | Req | - |
|       REFERENCE-OBJECT-SCOPE | L | LUDF | C37141 | Y | 1 | Req | 3 |
|     From Group | D | --- | --- | Y | 0-n | J | - |
|       From Group Prefix | L/pfx | LUDF | C32B41 | Y | 1 | Req | - |
|         IDENTIFIED-DATA | A | LUDF | C32042 C32048 | --- | 1-n | Exc | - - |
|         Search Group | D | --- | --- | --- | 1 | Exc | - |
|           Search Group Prefix | L/pfx | LUDF | C34B41 | Y | 1 | Req | - |
|             Search Filter | --- | --- | --- | --- | --- | Req | 6 |
|           Search Group Suffix | L/sfx | LUDF | C34C41 | Y | 1 | Req | - |
|         Using Name | A | LUDF | C31442 C31448 | --- | 1 | Exc | 4 |
|         Where Group | D | --- | --- | Y | 0-n | K | 27 |
|           Where Group Prefix | L/pfx | LUDF | C33541 | Y | 1 | Req | - |
|             Data Attributes | L | LUDF | C70141 | Y | 1 | Opt | - |
|               GCID | A | LT | 01 | Y | 1 | Req | 5 |
|             Search Filter | --- | --- | --- | --- | --- | Exc | 6 |
|             Using Name | A | LUDF | C31442 C31448 | --- | 1 | Exc | 7 |
|           Where Group Suffix | L/sfx | LUDF | C33641 | Y | 1 | Req | - |
|             Where Joiner | A | LT | 02 | --- | 1 | A | 8 |
|           Using Name | A | LUDF | C31442 C31448 | --- | 1 | E | 9 |
|       From Group Suffix | L/sfx | LUDF | C32C41 | Y | 1 | Req | - |
|         From Joiner | A | LT | 02 | --- | 1 | B | 20 |
|       Using Name | A | LUDF | C32442 C32448 | --- | 1 | F | 9 |
|     Find Group Suffix | L/sfx | LUDF | C34741 | Y | 1 | Req | - |
|       Find Joiner | A | LT | 02 | --- | 1 | C | 20 |
|     Using Name | L | LUDF | C32442 C32448 | --- | 1 | G | 9 |
|   IN Group Suffix | L/sfx | LUDF | C33B41 | Y | 1 | Req | - |
|     IN Joiner | A | LT | 02 | --- | 1 | D | 20 |

FIG. 16.

Search Criteria Document – Phrase Type

| Structure Name | Struct Type | Introducer | IDF/T | Order | Mult Occur | Exist Crite | Value Desc |
|---|---|---|---|---|---|---|---|
| Parametric Search Criteria Atom | D | – | – | N | | Opt | – |
|   Parametric Search Criteria Atom Pfx | L/pfx | LLIDF | C34341 | Y | 1–n | Req | – |
|     Parametric Predicate | A | LT | 02 | – | 1 | Req | 10 |
|     PS Mask Character | A | LT | 03 | – | 1 | L | 11 |
|     Wild Card Character | A | LT | 04 | – | 1 | L | 11 |
|     Object Identifier | L | LLIDF | CA5A4X | Y | 1 | Req | 23 |
|       Object | A | LT | 02 | – | 1 | Req | 12 |
|       Sub-object | A | LT | 03 | – | 0–n | Opt | 13 |
|       Parameter | A | LT | 04 | – | 1 | Req | 14 |
|       GCID | A | LT | 01 | --- | 1 | Opt | 22 |
|       Lgrpid | A | LT | 14 | --- | 1 | Opt | 23 |
|       Ctryid | A | LT | 15 | --- | 1 | Opt | 23 |
|       Nlngid | A | LT | 16 | --- | 1 | Opt | 23 |
|       Netid | A | LT | 05 | --- | 1 | Opt | 23 |
|       Entname | A | LT | 06 | --- | 1–n | Req | 23 |
|     Comparison Data | L | LLIDF | CA5B41 | Y | 1–n | Req | 15 |
|       Data Attributes | L | LLIDF | C70141 | Y | 1 | M | – |
|         GCID | A | LT | 01 | Y | 1 | Req | 16 |
|       Compare Data | A | LLIDF | CA5C01 CA5C41 | Y | 1 | N | 17 |
|   Parametric Search Criteria Atom Sfx | L/sfx | LLIDF | C34441 | Y | 1 | Req | – |
|     Parametric Search Joiner | A | LT | 02 | – | 1 | Opt | 8 |

FIG. 17

Search Criteria Document – Phrase Type

| Structure Name | Struct Type | Introducer | IDF/T | Order | Mult Occur | Exist Crite | Value Desc |
|---|---|---|---|---|---|---|---|
| IN Phrase | D | --- | ---- | N | 1 | Opt | – |
|   In Group Prefix | L/pfx | LLIDF | C33A41 | Y | 1 | Req | – |
|     Library | L | LLIDF | C33041 | --- | 1-n | Req | 1 |
|       GCID | A | LT | 01 | --- | 1 | Req | – |
|       Library name | A | LT | 02 | --- | 1 | Req | – |
|   In Group Suffix | L/sfx | LLIDF | C33B41 | Y | 1 | Req | – |
| FROM Phase | D | --- | --- | N | 1 | Opt | – |
|   From Group Prefix | L/pfx | LLIDF | C32B41 | Y | 1 | Req | – |
|     IDENTIFIED-DATA | A | LLIDF | C32042 C32048 | --- | 1-n | Exc | –_- |
|     Search Group | D | --- | ---- | Y | 1 | Exc | – |
|       Search Group Prefix | L/pfx | LLIDF | C34B41 | Y | 1 | Req | – |
|       Search Filter | ---- | --- | ---- | --- | --- | Req | 6 |
|       Search Group Suffix | L/sfx | LLIDF | C34C41 | Y | 1 | Req | – |
|   From Group Suffix | L/sfx | LLIDF | C32C41 | Y | 1 | Req | – |
| WHERE Phrase | D | --- | ---- | N | 1 | Opt | – |
|   Where Group Prefix | L/pfx | LLIDF | C33541 | Y | 1 | Req | – |
|     Data Attributes | L | LLIDF | C70141 | Y | 1 | Opt | – |
|       GCID | A | LT | 01 | Y | 1 | Req | 5 |
|     Search Filter | ---- | --- | ---- | --- | --- | Exc | 6 |
|   Where Group Suffix | L/sfx | LLIDF | C33641 | Y | 1 | Req | – |

FIG. 18

COMBINING SEARCH CRITERIA TO FORM A SINGLE SEARCH AND SAVING SEARCH RESULTS FOR ADDITIONAL SEARCHES IN A DOCUMENT INTERCHANGE SYSTEM

This application is a continuation of Ser. No. 458,061 filed on Dec. 28, 1989, now abandoned.

CROSS REFERENCE TO RELATED APPLICATION

This application is related in subject matter to the following application filed concurrently herewith and assigned to a common assignee:

Application Ser. No. 458,037, filed by Kastelic, et. al. entitled "Document Interchange Search Command" now abandoned, and continues to Ser. No. 07/767,522.

The foregoing co-pending application is incorporated herein by reference.

FIELD OF THE INVENTION

This invention relates to expanding user access to a library of shared documents, and more particularly, to searching a shared library for previously stored documents and saving both the search criteria used in locating the documents as well as the documents.

BACKGROUND OF THE INVENTION

Electronic office systems frequently provide for the sharing of information through the use of data repositories called electronic libraries. These electronic (shared) libraries are capable of being accessed by users of common networks as well as users of networks of interconnected pieces of equipment and progress. A user (end user) may be any person, device, program, or computer system that utilizes the systems for information processing and information exchange. Along with the increase in the number of users storing and retrieving information from such libraries are the accompanying problems of locating information once it has been stored in a shared library. The problem of later locating a particular document is further exacerbated with a proliferation in the number of electronic libraries available to a particular user. Instead of a single common repository, users may have a plurality of these libraries accessible on a common or interconnected network.

A SEARCH command is used to locate library information in these shared libraries based on selection conditions specified with the command. The SEARCH command provides a search criteria used for locating particular documents. Once the search criteria is used, it is discarded. A user wishing to search a plurality of shared libraries must reformulate the search criteria for each shared library to be searched. In a like manner, the results of a search are discarded after presentation to a user following execution of the SEARCH command. A user cannot specify that the results should be saved for later reuse. In particular, a user is unable to specify that the search results are to be stored in a document that forms a relationship with another document. For example, electronic libraries provide means whereby a document may exist within another document similar to a folder. A user is unable to specify that the search results obtained from applying a particular search criteria is to be stored within one of documents existing in a folder relationship.

Consequently, what is needed is a technique for saving the search criteria used to locate documents stored in a shared libraries as well as the documents located as a result of applying the search criteria.

SUMMARY OF THE INVENTION

This invention relates to a method of saving a search criteria and the documents located as a result of applying the search criteria in a document interchange management system having a plurality of shared libraries. This invention provides a Search Criteria Document for storing a document interchange management system's encoded search criteria. The Search Criteria Document is reusable for additional searches within one of a plurality of shared libraries as specified by the user. The documents located as a result of applying the search criteria may be saved in a Search Result Document. This Search Result Document is reusable and can be used to save additional documents located or uncovered as a result of searches on other shared libraries. In addition, the user is provided with a means of storing the Search Result Document contents in a document having a relationship with another document such as a folder.

BRIEF DESCRIPTION OF THE DRAWINGS

FIG. 3 is a document interchange SEARCH command with its available operands.

FIG. 3A is a preferred response when the SEARCH command of FIG. 3 is executed.

FIG. 5 is the Backus Nauer Form for a filter used in selecting documents to be included as part of the results of a search.

FIG. 7 is the structure for the Search Result Document sub-profile.

FIGS. 8, 9, 10, 11, 12 and 13 are structures for the parameters for a Search Result Document sub-profile.

FIGS. 14, 15, 16, 17 and 18 are the formats for encoding storage documents for the SEARCH command.

DETAILED DESCRIPTION

Figure 1:
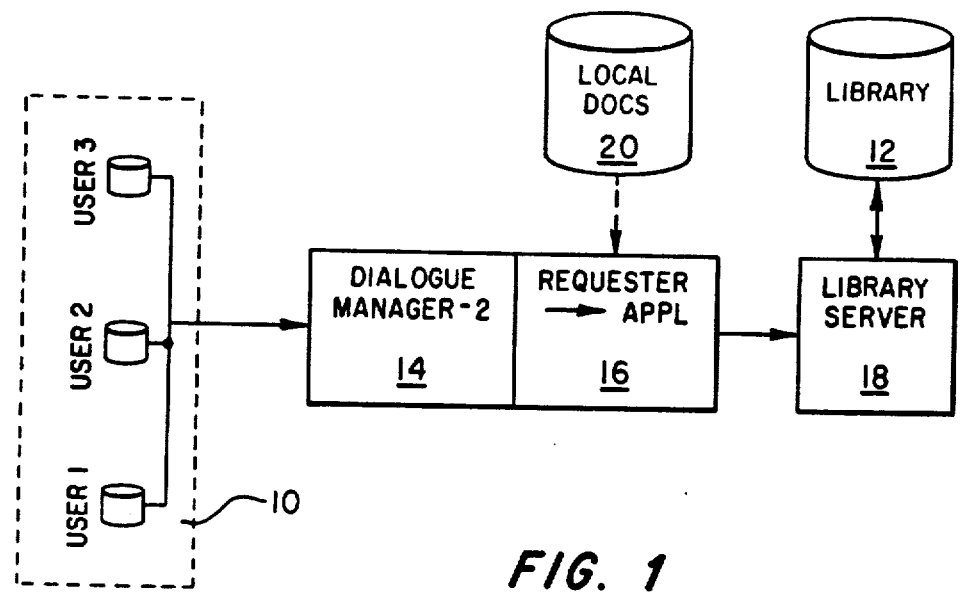
FIG. 1 is a block diagram of a document interchange management system where this invention may be practiced.

FIG. 1 shows a document management system for exchanging documents stored in a shared library between the shared library and a plurality of end users. A plurality of end users 10 may store and retrieve documents in a shared library 12. A user (end user) may be any person, device, Program, or computer system that utilizes the system for data processing or information exchange. One prior art structure for conveying any document, irrespective of its content, from one type of document management system to another is the Document Interchange Architecture (DIA).

DIA is a program-to-program communication architecture which defines the protocols and data structures, which when followed or used by programmers, enables programs to interchange information such as documents and messages in a consistent and predictable manner. DIA is independent of the type of information managed. DIA includes document objects which contain parameters or descriptors that describe the contents of the information being transmitted. The descriptors contained in the objects include the name under which the information is filed, the authors, the subject of the invention and the date the information was filed.

The library 12, when implemented using DIA structures, is capable of being accessed flexibility and simultaneously by a plurality of users and represents a common repository or shared resource. Unlike the shared library 12, a user's personal or private documents are stored in a local resource 20. This local storage resource 20 is usually not shared with other users and each user has dedicated space within the resource. Users may access this local storage 20 through the dialogue manager 14 and the requester application 16. The dialogue manager 14 and requester application 16 also interface with the library server 18 which controls a user's access to the shared library 12. When a user files a document in the library 12, the library server 18 constructs parameters or descriptors that describe the contents of the information being stored in the library.

Figure 2:
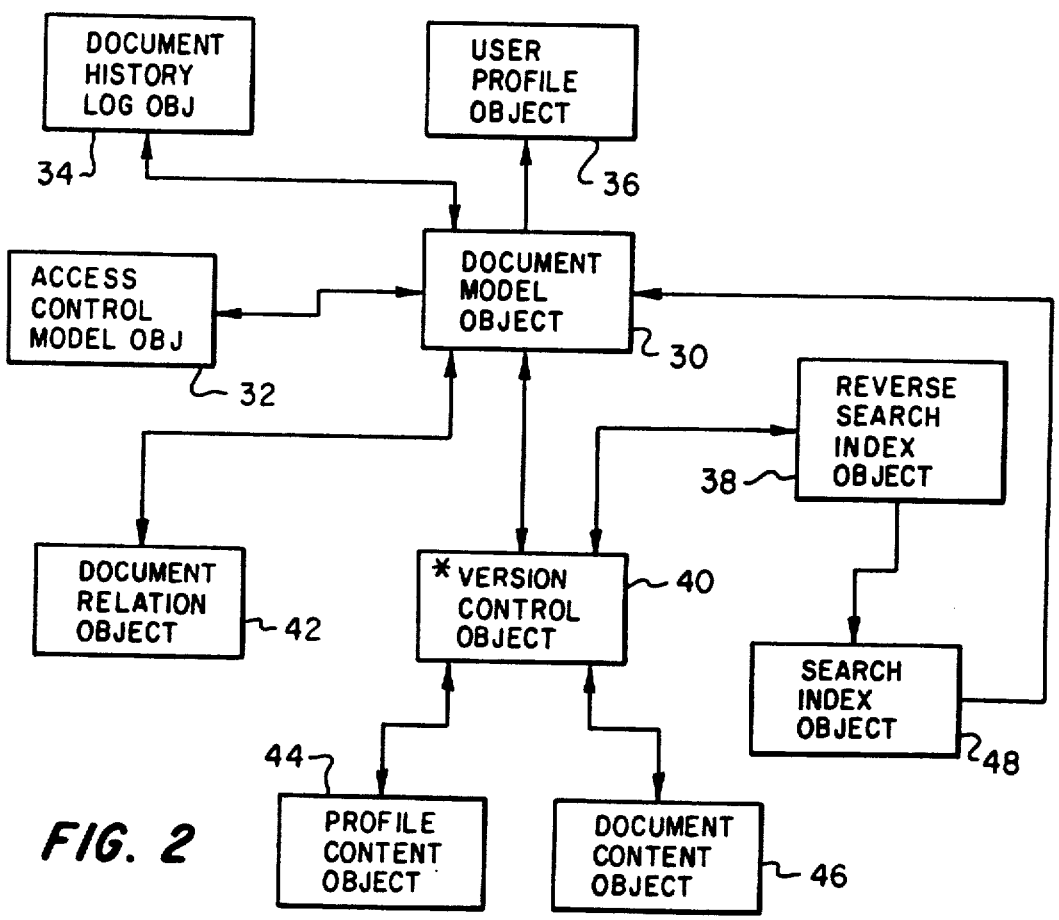
FIG. 2 is a basic document model created for each document filed in the library of the system shown in FIG. 1.

Referring to FIG. 2, a basic document model is shown for information stored in the library 12 as shown in FIG. 1. This document model is created by the library server 18 and is stored with each document. While it is not necessary to implement the basic document model explicitly to support DIA library service architecture, there is the requirement that a design be mapped to these models, or to a subset of them. A brief description of each component of the basic document model will now be given.

The User Profile Object 36 (UPO) is not part of the DIA document model, but is instead an object referred to by the DIA document model. The User Profile Object 36 is created when the users represented are logged members of an Office System network. It identifies a user and contains information about the user such as aliases, services authorized to the user, default accounting information, and other user-specific information.

The Document Model Object 30 is the heart of the DIA document model and is logically the first object created when a document is filed for the first time in a document library. It contains information concerning ownership and attributes of a particular document. More specifically, it contains document instance attributes, such as whether the document is editable or not-editable; the maximum number of versions; and the action to be taken if the user has attempted to edit a document that cannot be edited.

The Access Control Model Object 32 (ACMO) is created when a document is filed for the first time into a DIA library. The principle purpose of the Access Control Model Object 32 is to consolidate information to be used in determining non-owner access to the document. It contains access control information such as whether the document is capable of being accessed by any one (public), whether access is permitted to a limited number of explicitly specified users (private), or whether the information is shared with others.

The Document History Log Object 34 (DHLO) is optionally created when a document is filed in the library and the user wishes to record various activities on the document. For example, a user may wish to record the number of times the document was read and by whom.

The Document Relation Object 42 (DRO) is created when a document is first filed in the library. Its purpose is to describe the logical relationships between a document and other related or grouped documents. For example, the DIA architecture allows folder documents to be created that contain other documents. When such a relationship exists, then each document contained within the folder has a pointer entry called a Library Assigned Document Name (LADN) in the Document Relation Object 42.

The Version Control Object 42 (VCO) is created when a document is first filed into the library and contains information for several objects that may comprise a single named version of a document. It provides space for version naming, version level locks, and other version related level process controls.

The Profile Content Object 44 (PCO) is created when a document is first filed into the library and a user wishes to create sub-objects for performance or other reasons. The Profile Content Object 44 is the repository for Profile information related to the sub-objects.

The Document Content Object 46 (DCO) is created when a document is first filed into the library and provides storage for the document contents. In addition, the Document Content Object 46 provides storage for saving information concerning the actual size of the document in various units of measurement.

The Search Index Object 48 (SIO) contains entries used in searching within a document. The entries are placed in the SIO 48 as a result of the following sequence of actions on other objects. The basic Document Model Object 30 is first created as part of processing a FILE command. The Library Server then scans the Profile Content Object 44, the Document Relation Object 42, and the Access Control Model Object 32 to find terms to be used to support a parametric SEARCH. As each term is identified, an entry is made in the Search Index Object 48 whose name includes the parametric search term value and semantics. If no SIO 48 exists when the Library Server scans the aforementioned objects, one is created and the entries placed therein as if the SEARCH Index Object 48 always existed.

The Reverse Search Index Object 38 (RSIO) exists to support the removal of Search Index Object 48 entries when a document is removed from the library by a DELETE command. Entries for parametric search terms are placed in the RSIO 38 at the same time they are being made in the Search Index Object 48.

Turning to FIG. 3, a SEARCH command is shown along with its available operands. This command is used to locate documents in the library 12 of FIG. 1. Documents that satisfy a specified search criteria are returned to one of the users 10 making the search request. The search criteria may consist of combinations of DIA document profile parameters, document model object parameters, folders, and contextual search data. The search criteria may also be enterprise-specific search terms added to a document by an enterprise of related users, i.e., a bank. The input to the SEARCH command includes the libraries to be searched, the criteria used to qualify the document, the amount of time to spend searching, the maximum number of documents which may be selected, and what information to return for the documents selected. This invention is directed to saving the search criteria used to qualify the documents for a search as well as saving the documents returned as a result of applying the search criteria. Implied within the SEARCH command is support for DIA access rules. These rules as applied to the SEARCH command require that only those documents to which the requester (user) is authorized may be filtered with the search conditions specified.

The operands for the SEARCH command are shown in FIG. 3 and will be briefly described. The IDENTIFIED-DATA operand identifies the document which contains the selection criteria used to qualify a document for inclusion in the results of the search. The identified document must have a document type of Search Criteria Document (SCD) or Search Result Document (SRD) and conform to their internal formats. The absence of this optional operand results in a search for all documents which the requester/user has access.

The REFERENCED-DATA operand identifies an existing document which will be updated with the results of the current search. This document must have a document type of Search Result Document (SRD) or an exception will be raised. This operand may optionally be supplied to identify a context (folder or stapler) into which the Search Result Document should be added.

The SEARCH-DOCUMENT-NAME operand is optional and specifies both the profile GCID and the document name value of the Search Result Document to be created or updated by the SEARCH process. If this operand is missing, no Search Result Document (SRD) will be created.

The ON-BEHALF-USER operand is optional and identifies the user on whose behalf the SEARCH is to be done. The search is performed as if the ON-BEHALF-USER user was the command requester. If a Search Result Document is created, the ON-BEHALF-USER is the owner of the new document.

The RETRIEVE-COUNT operand, when present and indicating a value greater than zero, specifies the maximum number of document descriptors that will be returned. A RETRIEVE-COUNT of zero specifies that the requestor/user only wants the document type sub-profile for the Search Result Document. In such a case, the total number of documents or document descriptors are returned instead of the actual documents or document descriptors.

The DESCRIPTOR-CONTENT-DEFINITION operand specifies the content of the Document Descriptor Document (DDD) be delivered as part of the reply to the SEARCH command. If the operand is omitted, the LADN and optionally the library name will be stored.

The TIME-LIMIT operand is optional and if present specifies the maximum number of minutes (from 1 to 1440) that the command server should allow the search process to execute. If this operand is omitted, the search will run until each document within the specified scope is examined.

The SELECT-LIMIT operand is optional and if present specifies the maximum number of documents that the requestor/user wants the command server to allow during the search process. If this operand is missing, the maximum number of documents is determined by the command server.

With particular reference to FIG. 3A, there is shown the preferred response when the SEARCH command is successfully executed. At the normal conclusion of a search, a reply will be delivered to the requester by a DELIVER command. If the SEARCH command terminates abnormally, a reply will sent via the ACKNOWLEDGE command along with an exception condition.

Figures 4, 6:
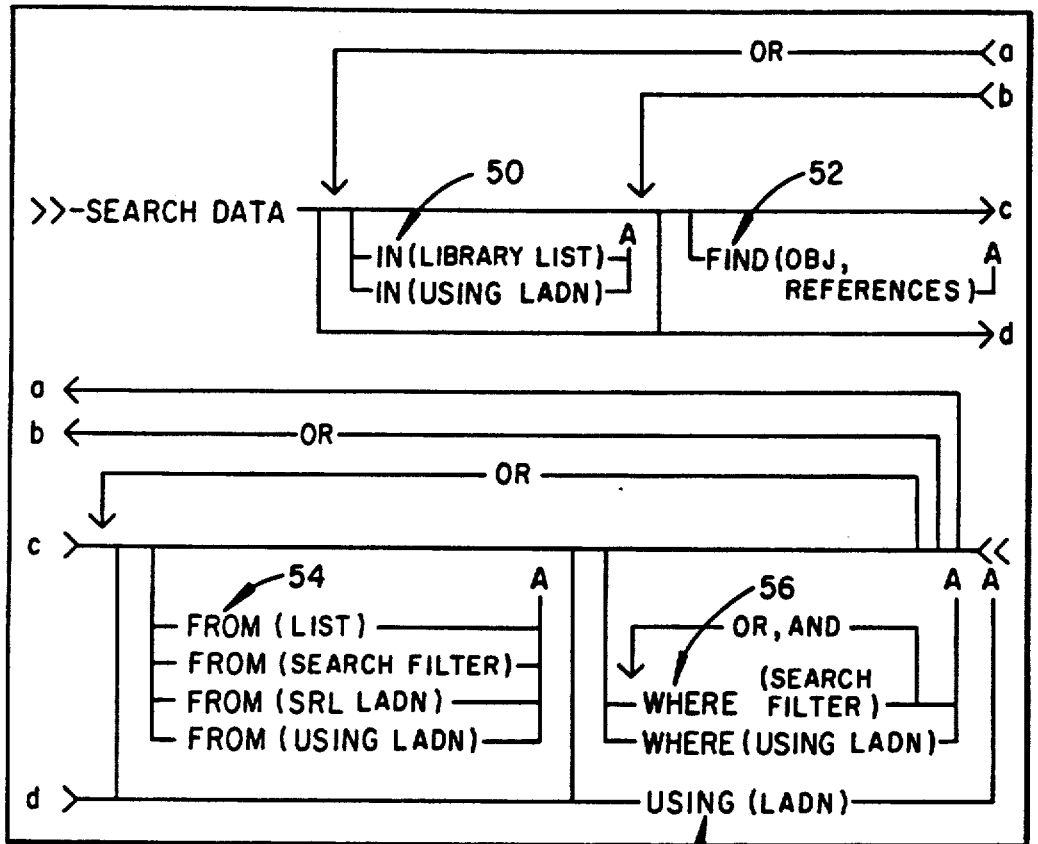
FIG. 4 is a search selection criteria for the SEARCH command shown in FIG. 3.
FIG. 6 specifies the predicates allowed for the SEARCH command shown in FIG. 3.

Turning to FIG. 4, the scope and filter portions of the SEARCH command are illustrated. A search scope is set by specifying the set of libraries, the documents within the libraries, and the depth within a folder to be examined when documents are contained within the folder.

The IN phrase 50 allows a user to specify the libraries (library scope) to be searched. The SEARCH command uses the IN phrase 50 to identify the libraries which contain the documents that are to be filtered with the search filter. When multiple libraries are specified, the results of the combined search will be stored at the library associated with the library server executing the SEARCH command. The library server is also responsible for the coordination of the SEARCH command with the other libraries specified. It is not a requirement that the library server search its own library when executing the SEARCH command. In the absence of a library scope, the library associated with the library server processing the SEARCH command is the default.

The FIND phrase 52 specifies the depth of the search. A user is allowed to specify whether the objects identified in the FROM phrase are to be searched. More importantly, the FIND phrase specifies the depth to which the objects related to the identified objects are to be searched. This is especially significant when the identified object is a folder document containing a number of related document. In the absence of a search depth, only the documents within the search scope are filtered to the "direct references" or identified objects.

The FROM phrase 54 allows the specification of a folder, a Search Result Document (SRD), or a list of documents to which to apply the filter. When the FROM phrase specifies a list of documents, this list may be specified as a list of Library Assigned Document Names (LADNs) or as a stored list in a Search Result Document's (SRD) search result section. The SEARCH command will only apply the search filter to those documents contained within the scope indicated by the list. In the absence of a document scope, all documents that the user has at least read access to will be included in the search.

The WHERE phrase 56 specifies the document filter which selects a document for inclusion in the search results. The simplest element of the WHERE phrase 56 is a criteria atom. This invention supports both parametric search criteria atoms and contextual search criteria atoms. A parametric search criteria atom is specified as a predicate, object identifier, and one or more parameter identifiers with data. Where the parameter identifier requires a GCID for character set code page identification, this information is also contained within the search information. A parametric search criteria atom may be used as a filter for semantic parameters contained within the various document model objects. For example, returning to FIG. 2, a parametric search criteria atom may be used to access semantic parameters in the Document Model Object 30 (DMO), Access Control Model Object 32 (ACMO), Document Relation Object 42 (DRO) or Profile Content Object 44 (PCO). If data is specified with the parameter identifier, it is compared to the data in the selected document model objects using the predicate specified. Therefore, the SEARCH command supports the specification of parameters and parameter fields which have semantic meaning.

Referring again to FIG. 4, each of the search criteria scope phrases may be repeated to form a compound scope or filtering phrase. For example, the IN 50, FIND 52, and FROM phrases 54 may be joined with the OR predicate to form a compound scope phrase. Likewise, the WHERE phrase 56 may be joined with either the AND or OR predicates to form a compound filter phrase. Whenever a compound combination is formed using the AND and OR predicates, the AND predicate takes precedence and is executed before the OR predicate.

Turning to FIG. 6, the predicates allowed for different data types in a parametric search criteria atom are shown. The parameter types supported include binary (BIN), character (CHAR) and enumerated (ENUM).

Referring again to FIG. 4, criteria atoms may be combined to form more complex filters. When complex filters are created using a combination of the AND and OR predicates, the AND predicate is executed before the OR predicate. In addition, the WHERE phrases 56 may be nested within themselves to further specify a filter. In the absence of a search filter, all document contained within the search scope will be selected.

With particular reference to FIG. 5, the Backus Nauer Form (BNF) for the WHERE phrase 56 is shown. As indicated, a search filter may consist of a criteria atom along with various combinations of search filters or the WHERE phrase 56.

The contextual search criteria atom is different from the parametric search criteria atom in that it uses an index which is derived from information contained in the document context.

Returning to FIG. 4, the SEARCH command supports the use of stored criteria to search for objects in a shared library. This means that the search criteria may be saved for later use. This may be provided through the USING phrase 58 of the illustrated search criteria. A user may specify that the contents of a Search Criteria Document (SCD), which is the document interchange management system's encoding for the search criteria phrase, be stored for later reuse. The Search Criteria Document may be of phrase specific or appended form.

The phrase specific form allows the IN 50, FROM 54, and WHERE 56 phrases to be applied to the search process from a stored document. For the IN phrase 50, the contents of the stored document is the list of libraries to search. The FROM phrase 54 uses the search results list, list of LADNs, or search filter as the stored documents. The WHERE phrase 56 allows the stored document to be the search filter.

The appended form allows the ending phrase or phrases of a search to be supplied to the search process from a stored document. Using the appended form, a user may supply the search with all phrases following the IN phrase 50.

In addition to allowing the search criteria to be stored and reused, the search results may also be stored. The filtering of documents with the search criteria atoms results in a list of document. This list may optionally be stored in a Search Result Document (SRD) for later reference.

The Search Result Document (SRD) has a registered document type of SRD. It contains a document type sub-profile for search specific information. The Search Result Document contents consist of: 1) the search criteria used for the search; 2) the results of the search; and 3) the contextual search probe information. The search criteria portion of the SRD contents is defined as a Search Criteria Document—appended type. The results portion of the SRD contents contains an entry for each document found which meets the specified search criteria. Each entry contains the LADN and optionally the library name as the default. When the library name is not present, the default library from the searched libraries parameter of the Search Result Document (SRD) profile contains the document. The requester may specify other library model object parameters to be stored in the Search Result Document by specifying them in the SEARCH-RESULT-DOCUMENT-CONTENT operand of the SEARCH command. The results of the search may also contain the probe data for the documents found. The probe data is a list of search terms used by the contextual search process to select the documents for inclusion in the Search Result Document (SRD).

When the user specifies a Search Result Document, the DIA library server executing the SEARCH command must create Search Result Document (SRD) sub-profile parameters. Some of the parameters are part of the command input and others result from the execution of the SEARCH command. None of the parameters in the SRD sub-profile are modifiable.

Turning to FIG. 7, the structure for the Search Result Document (SRD) sub-profile is shown. The SRD sub-profile uses a syntactic structure consisting of self-defining structured fields. The parameters may consist of single or multiple value fields. The parameters that consist of two or more values contain length and type field delimiters for each of the values. The Search Result Document sub-profile introducer (LLIDF) consists of the length field (LL), the structured field identifier (ID), and the format byte field (F). The length field (LL) is two bytes in length and specifies the total byte length of the application sub-profile introducer and all of the specified parameters. Only the parameters specified in FIG. 7 may be used in the sub-profile.

The "Date/Time Search Executed" parameter is required and is set by the search process that creates or updates the Search Result Document (SRD). FIG. 8 illustrates the SRD sub-profile with the "Date/Time Search Executed" parameter. The DTM field consists of seven sub-fields of discontinuous binary values in the format indicated in FIG. 8.

The "Time Limit" parameter is illustrated in FIG. 9 and contains the value of the time limit operand on the SEARCH command which resulted in the creation or update of the SRD. This parameter is optional and if absent indicates that no time limit operand was present on the SEARCH command. The time field is a two byte binary number from 1 to 1440 which specifies the maximum number of minutes that the SEARCH process should be permitted to execute.

Turning to FIG. 10, the "Select Limit" parameter structure is shown which contains the value of the select limit operand specified on the SEARCH command. The 4-byte binary number specifies the maximum number of documents the search process may select and cannot be zero Referring to FIG. 11, the "Count" parameter structure is shown which contains the number of documents qualified by the SEARCH command which resulted in the creation or update of the Search Result Document (SRD). This required parameter always reflects the contents of the SRD.

The "Searched Libraries" parameter is shown in FIG. 12. It contains a list of libraries which were searched using the search criteria. One and only one library must be assigned by the search process as the default library in the libraries searched parameter. If the search criteria contains no IN phrase group, the value of the default library in this parameter is set to the name of the library where the SEARCH command was executed. The "Searched Library" parameter contains one or more fields. The optional GCID field specifies the code page ID for all subsequent LIBRARY NAMEs. The Language Group Identification (LGRPID) field is 2-bytes and identifies the National Language Group to which the language being identified belongs. The Country Identification (CTRYID) field is 2-bytes and contains the code assigned to the country with which the national language information is being related. The National Language Identification (NLNGID) is optional and contains a code assigned to the National Language being identified. The field is 2-bytes and the code reflects any dialect of a particular language. The Default Library field is 1 to 44 bytes and contains the name of the default library. It is a required field and can appear only once. The Other Library field is 1 to 44 bytes and contains the name of the libraries other than the Default Library. It is an optional field and can appear more than once.

FIG. 13 illustrates the structure for the "Exception Code" parameter. Its existence indicates the SEARCH command was executed successfully, but that certain conditions were detected that may have caused incomplete results.

Execution of the SEARCH command without specification of a Search Result document results in the return of a Document Descriptor Document (DDD) upon successful completion of a search. The DDD is returned to the requester in the Document Unit of the DELIVER command. In order to be executed on a document interchange system, the Document Descriptor Document (DDD), Search Result Document (SRD) and Search Criteria Document (SCD) must conform to DIA encoding as formally described in encoding tables.

The required DIA encoding tables contain the formatting information required to either parse or build DIA search data streams. The structure for building the Document Descriptor Document (DDD), Search Result Document (SRD) and Search Criteria Document (SCD) is shown in FIGS. 14-18, respectively. FIGS. 16 and 17 shows the structure for the Search Criteria Document—Appended form and FIG. 18 shows the structure of the Search Criteria Document phrase form.

With particular reference to FIGS. 14-18, the first column of the DIA encoding tables must identify the DIA structures by name and illustrate hierarchical relationship between these structures by indentation of the column entries. The order of the structure entries in the table represent, unless otherwise specified, the order in which the structure appears in a DIA data stream. The remaining columns describe the encoding characteristics, atomic values, and existence criteria for each of the named structures.

The structure type may be atomic (A), length-bounded parent (L), or delimited parent (D). An atomic structure contains its own introducer followed by data. Every DIA structure is bounded by its own length and identification bytes that are collectively known as the "introducer". An introducer may be either two bytes in length, referred to as an LT (Length and Type), or five bytes in length, referred to as an LLIDF (Length and Identifier). The length-bounded (L) structure means that a structure is bounded by an encompassing structure. A hierarchical relationship exist in which the length of the encompassing structure, referred to as a "parent structure", includes the lengths of all encompassing structures, referred to as "child" structures. The delimited parent (D) structures are used to define logical groups of structures by defining the corresponding parent structures. The logical group is defined at a single encoding level by designating the first and final children of the logical group as delimiters. The first child which acts as the start delimiter is indicated by "L/pfx" in the structure type column of the encoding table. The last child which acts as the end delimiter is indicated by "L/sfx" in the encoding table. The length of these delimiters encompass only themselves.

The introducer as previously described may be either "LLIDF" or "LT". The IDF/T column contains the IDF or T value in hexadecimal.

The order column serves to indicate if a parent structure have either ordered or unordered children. Ordered children must occur in the data stream in the same order as they are described in the encoding table. Unordered children are allowed to occur in the data stream in any order. A value of "Y" in this column indicates that children are ordered. A value of "N" indicates that children are unordered. A value of "—" indicates that no children are present.

The multiple occurrences column indicates that multiple occurrences of DIA structures may or may not be permitted. A value of "1-n" indicates that there is no architected limit. A value of "1" indicates that only a single instance of the corresponding structure is appropriate.

The existence criteria column serves to convey whether an incoming data stream has the appropriate combination of IDFs and Ts. A DIA implementation must know the conditions under which each IDF/T is either required or precluded. These conditions may have one of the following values:

REQUIRED—Omission considered DIA syntax violation
OPTIONAL—Presence is strictly optional
CONDITIONAL—Presence is conditional
EXCLUSIVE—Only one of the structures are required
ALPHABETIC—The corresponding structure is given in the Existence Criteria Table (See Tables 1 and 2)

TABLE 1

| EXISTENCE CRITERIA TABLE | |
|---|---|
| KEY | EXISTENCE CRITERIA |
| A | The WHERE joiner is present if multiple WHERE phrases are contained in the data stream. The last WHERE phrase does not contain a joiner. Should one be present on the last phrase a syntax exception is raised. |
| B | The FROM joiner is present if multiple FROM phrases are contained in the data stream. The last FROM phrase does not contain a joiner. Should one be present on the last phrase, a syntax exception is raised. |
| C | The FIND joiner is present if multiple FIND phrases are contained in the data stream. The last FIND phrase does not contain a joiner. Should one be present on the last phrase a syntax exception is raised. |
| D | The IN joiner is present if multiple IN phrases are contained in the data stream. The last IN phrase does not contain a joiner. Should one be present on the last phrase a syntax exception is raised. |
| E | The USING name indicates that beginning with the WHERE phrase the search criteria is being supplied from a search criteria document - APPEND type in the library. |
| F | The USING name indicates that beginning with the FROM phrase the search criteria is being supplied from a search criteria document - APPEND type in |

TABLE 1-continued
EXISTENCE CRITERIA TABLE

| KEY | EXISTENCE CRITERIA |
|---|---|
| | the library. |
| G | The USING name indicates that beginning with the IN phrase the search criteria is being supplied from a search criteria document - APPEND type in the library. |
| H | The IN Group is optional & if not present defaults to the library associated with the library service executing this command. |
| I | The presence of a FIND Group is optional and if not present defaults to include the FROM Group Objects themselves and objects in the first level relationships to them. |

TABLE 2
EXISTENCE CRITERIA TABLE

| KEY | EXISTENCE CRITERIA |
|---|---|
| J | The FROM Group is optional and if not present the library service filters all documents to which the requester has at least read access. |
| K | The WHERE Group is optional and if not present the library service returns a list of all documents which meet the criteria specified by the IN, FIND, and FROM phrases. |
| L | This operand may optionally be present when the parametric operand is set to the LIKE value. The absence of this parameter indicates an exact character match with the value provided is required. |
| M | The DATA ATTRIBUTES operand may be specified where the OBJECT IDENTIFICATION operand specifies a parameter which is GCID dependent. The search process uses this value to transform the input search parameter values to that of the stored data prior to performing the predicated comparison. A null search result when a transform is not possible. |
| N | The Compare Data operand is required. Formats 01 and 41 for the operand are supported. When the F byte of the parameter element of the Object Identification operand is "01", the Compare Data (Format 01) operand is used. When the F byte of the parameter element of the Object Identification operand is "41", the Compare Data (Format 41) operand is used, and the actual data is proceeded by "LT" structured fields as defined by the referenced model objects. |

The value description column indicates that the data value in this atomic structure has a particular semantic. The semantics for each of the data values are given in the following Value Description Tables (see Tables 3–8).

TABLE 3
VALUE DESCRIPTION TABLE

| KEY | VALUE DESCRIPTION |
|---|---|
| 1 | This operand contains the office system network name for the library which is to be searched. It is used as a directory argument by the search process to locate the network address of the library to be searched. |
| 2 | The USING NAME operand identifies a document in the service processes library. The document has a document type of search criteria document - Phrase Type and contains a library group phrase consisting of a library group prefix, one or more library operands, and a library group suffix. USING NAME (Format 42) and USING NAME (Format 48) are supported. USING NAME (Format 42) consists of the DTM and DNID suboperands. These suboperands have the same formation as the similarly name suboperands of the IDENTIFIED DATA (Format 42) operand. |

TABLE 3-continued
VALUE DESCRIPTION TABLE

| KEY | VALUE DESCRIPTION |
|---|---|
| | USING NAME (Format 48) consists of one or more ordered UN suboperands. These suboperands have the same format as the similarly name suboperands of the IDENTIFIED DATA (Format 48) operand. |
| 3 | The REFERENCE-OBJECT-SCOPE parameter specifies: whether to include the objects identified by the FROM phrase; The depth to which search should examine the objects identified in the FROM phrase. The type of references that are referenced by the search depth field. Refer to the REFERENCE-OBJECT SCOPE operand for details. |
| 4 | The USING NAME identifies a document in the service processes library. The document has a document type of search criteria document - Phrase Type and contains a FROM Group Phrase consisting of a FROM group prefix, one or more document name operands, and a FROM group suffix. |

TABLE 4
VALUE DESCRIPTION TABLE

| KEY | VALUE DESCRIPTION |
|---|---|
| 4 | USING NAME (Format 42) and USING NAME (Format 48) are supported. USING NAME (Format 42) consists of the DTM and DNID suboperands. These suboperands have the same format as the similarly name suboperands of the IDENTIFIED DATA (Format 42) operand. USING NAME (Format 48) consists of one or more ordered UN suboperands. These suboperands have the same format as the similarly name supoperands of the IDENTIFIED-DATA (Format 48) operand. |
| 5 | The GCID parameter contains the four byte GCID for character data contained with in the WHERE phrase. This value may be superseded by values contained in a search criteria atom. |
| 6 | The BNF format description of the search filter portion of a Search filter is:<br><SEARCH FILTER>::= <criteria atom><br>    | <search filter> AND<br>    <search filter><br>    | <search filter> AND<br>    <search filter><br>    | WHERE PHRASE |
| 7 | The USING NAME operand identifies a document in the service processes library. The document has a document type of search criteria document - Phrase Type and contains a WHERE Group phrase consisting of a WHERE group prefix, parametric search criteria atom, and/or WHERE group phrases; and a WHERE group suffix. USING NAME (Format 42) and USING NAME (Format 48) are supported. USING NAME (Format 42) consists of the DTM and DNID suboperands. These suboperands have the same format as the similarly named suboperands of the IDENTIFIED DATA (Format 42) operand. USING NAME (Format 48) consists of one or more ordered UN suboperands. These suboperands have the same format as the similarly named suboperands of the IDENTIFIED DATA (Format 48) operand. |

TABLE 5
VALUE DESCRIPTION TABLE

| KEY | VALUE DESCRIPTION |
|---|---|
| 8 | This operand specifies how to join the phrases together. The Values are:<br>• X'00' - Reserved<br>• X'01' - Logical AND<br>• X'02' - Logical OR<br>• X'03' to X'FF' - Reserved |
| 9 | This operand contains the LADN of a document in the service processes library which contains the search phrase to append to the search command. The document has a document type of search |

TABLE 5-continued

VALUE DESCRIPTION TABLE

| KEY | VALUE DESCRIPTION |
|---|---|
|  | criteria document - Append Type of Search Result Document and contains a search command phrase to be appended to the phrases provided with the command. |
| 10 | This operand specifies how the value for the parameter contained within this atom is to be compared with the value stored in the library. The values are:<br>* X'00' - Reserved<br>* X'01' - Equal<br>* X'02' - not equal to<br>* X'03' - greater than<br>* X'04' - greater than or equal to<br>* X'05' - less than<br>* X'06' - less than or equal to<br>* X'07' - in<br>* X'08' - not in<br>* X'09' - between<br>* X'0A' - not between<br>* X'0B' - like<br>* X'0C' - are<br>* X'0D' to 'FF' - Reserved<br>Each of the above values is valid for only a closed set of object, subobject, and parameter set values. Refer to the Search Concepts and Facilities sections for details. |
| 11 | This parameter contains a one byte hexadecimal value. |

TABLE 6

VALUE DESCRIPTION TABLE

| KEY | VALUE DESCRIPTION |
|---|---|
| 12 | The object field contains a three byte IDF value used to identify the model object which contains the parameter field to be compared. It is a required field and may occur only once. |
| 13 | The sub-object field is conditionally required and may occur more than once if needed to completely qualify the parameter field. It is a 3 byte IDF which identifies a "sub-object" contained in the previous object or sub-object field. The last or only sub-object field must contain the parameter field to be compared. If no sub-object field is present, the object field itself must contain the parameter field. |
| 14 | The parameter field contains a three byte IDF value used to identify the object parameter to be compared. It is a required field and may occur only once. |
| 15 | The comparison Data operand specifies the data to be searched for.<br>For those parametric search predicates (IN, NOT IN, BETWEEN, NOT BETWEEN, ARE) which allow/require more then one search value, this field may be repeated n times.<br>An exception condition is raised when different parameter identifications are contained within the same atom. |
| 16 | GCID contains the four byte code page ID for character comparison data and overrides any GCID specified in the WHERE phrase. It is a required field. |
| 17 | The format of the Compare Data is the same as that of the data for the parameter being searched on. Where format 41 is used one or more LT fields may be specified. When LT fields are left out, the search process assumes that the requester does not care what the value for the parameter is and qualifies all documents which contain the specified field. Attributes LT fields are not searchable, that is, GCID fields. |

TABLE 7

VALUE DESCRIPTION TABLE

| KEY | VALUE DESCRIPTION |
|---|---|
| 18 | Rank is a two byte unsigned binary number. The rank is optionally present and when not present in a search result entry, a default of X'8000' is assumed. All search result entries which only qualified by reason of parametric criteria are assigned a value of X'8000'. |
| 19 | The objects, sub-objects, parameters, and sub-parameters are those requested in the DOCUMENT CONTENT-DEFINITION and the SEARCH-RESULT-DOCUMENT CONTENT operands of the SEARCH command. For a given model object, it can only appear once. This operand specifies how to join the phrases together. The values are:<br>* X'00' - Reserved<br>* X'01' - Not valid for IN, FIND, FROM<br>* X'02' - Logical OR<br>* X'03' - Not valid for IN, FIND, FROM<br>* X'04' - Not valid for IN, FIND, FROM<br>* X'05' - X'FF' -Reserved |
| 21 | See Document Interchange Architecture Interchange Document Profile Reference for a description of the contents of this sub-profile, the Search Result Document sub-profile. |
| 22 | The GCID field is optionally present to specify the GCID of the enterprise name. |
| 23 | The format byte of the OBJECT-IDENTIFIER will be X'44' if an attribute in the Enterprise-specific sub-profile is to be searched. Otherwise, it is X'41'. The scoping token ENTNAME and optionally the GCID and NLS related information must be present to identify the enterprise. To specify an enterprise-specific search term, the Object would be the IDF of the IDP, the sub-object would be the IDF of the Enterprise-specific sub-profile, the parameter would be the IDF of the search term to be modified, and the ENTNAME would be the name of the enterprise where the search term applies. NETID is a 1-8 byte character field. It specifies the network. If no NETID is specified, the local network is assumed. The ENTNAME field is a 1 to 44 byte string. It specifies the name of the enterprise. It is a required field, and can be repeatable to fully identify the enterprise. |

TABLE 8

VALUE DESCRIPTION TABLE

| KEY | VALUE DESCRIPTION |
|---|---|
| 24 | REFERENCED-DATA (Format 42) is an optional field to return folder relational information. It is used on a RETRIEVE command if the REFERENCE-OBJECT SCOPE specifies a folder type and the DESCRIPTOR CONTENT-DEFINITION was requested. ALL DOCUMENT DESCRIPTOR-DOCUMENT entries are assigned a DID number. Then documents in a folder use the RDID and REL fields to point to the folder, with the REL value of "Folder". |
| 25 | The Fully Qualified Unique Name (FQUN) is an optional field, and is present when the RETRIEVE OPTION operand specified FQUN retrieval and the document has a FQUN. If the FQUN was requested and is not present, either the document has no FQUN or the user does not have access to one or more elements of the FQUN. If all FQUNs were requested in the RETRIEVE-OPTIONS operands, and the document has more than one FQUN accessible to the user, this field may be repeated. |
| 26 | SEARCH-RANK is an optional field if the DOCUMENT DESCRIPTOR-DOCUMENT is not from a Search Result Document or if the SEARCH request did not contain criteria with contextual atoms. When the RETRIEVE command specifies a document other than a Search Result Document by the IDENTIFIED-DATA operand and the DESCRIPTOR-CONTENT-DEFINITION operand was specified, then all entries on the DOCUMENT DESCRIPTION-DOCUMENT do not have a SEARCH-RANK. |

TABLE 8-continued
VALUE DESCRIPTION TABLE

| KEY | VALUE DESCRIPTION |
|---|---|
| 27 | If there are no IN Group, FIND Group, FROM group in a Search Criteria Document, prefix and suffix constructs for the IN, FIND, and FROM groups are still required, but the data is optional. The encoding of the Search Criteria Document will be:<br>C33A41 (IN Group Prefix)<br>C33C41 (FIND Group Prefix)<br>C32B41 (FROM Group Prefix)<br>C33541 (WHERE Group Prefix)<br>. (WHERE Group detail)<br>.<br>.<br>C33641 (WHERE Group Suffix)<br>C32C41 (FROM Group Suffix)<br>C34741 (FIND Group Suffix)<br>C33B41 (IN Group Suffix) |

In summary, this invention provides a method of saving the search criteria as well as the search results in a document interchange management system. The search criteria is saved in a Search Criteria Document. This search Criteria Document may take phrase or appended forms. The phrase form allows a user to store the scope portion of the search criteria for later reuse. The appended form allows a user to create a stored criteria from all portions of the search criteria following the IN phrase. The search results may be saved in a Search Result Document. This Search Result Document may be stored in documents that have a relationship with other documents such as folders. This invention provides the structures for encoding each of the storage documents. A user is therefore provided with a flexible means for searching a plurality of shared libraries in a document management system and saving both the search criteria and search results.

While the invention has been particularly shown and described with reference to preferred embodiments thereof, it will be understood by those skilled in the art that various changes in form and details may be made therein without departing from the spirit and scope of the invention.

What we claim is:

1. A method of forming a single search criteria for locating a library object stored in one of a plurality of shared libraries by a library server in a document interchange management system, said library object existing as a first folder document containing a plurality of related documents in said shared libraries, said method comprising:

specifying at least one of said plurality of shared libraries by a user at said library server in said document interchange management system to be searched by said library server for said library object;

identifying said first folder document to be located by said user at said library in said document interchange management system by said library server;

combining said one of said plurality of shared libraries and said first folder document into said single search criteria and executing said single search criteria by said library server in said plurality of shared libraries to locate said first folder document and said plurality of related documents and storing the search results in a second folder document; and storing said single search criteria in a third folder document by said library server for use in additional searching of said shared libraries.

2. A method of forming a single search criteria for locating a library object stored in one of a plurality of shared libraries as recited in claim 1, wherein said identifying step further comprise:

identifying in said single search criteria an object filter for selecting said library object by said library server, said object filter having a predicate, object identifier and at least one parameter identifier.

3. A method of forming a single search criteria for locating a library object stored in one of a plurality of shared libraries as recited in claim 2, wherein said parameter identifier contains data found within said library object.

4. A method implemented in a document interchange management system of saving a single search criteria used in locating a document stored in one of a plurality of shared libraries by a library server, said document existing as one of a plurality of related documents within a folder document, said method comprising:

providing a first phrase by a user at said library server specifying at least one of a plurality of shared libraries in said document interchange management system to be searched for said document;

providing a second phrase by said user at said library server specifying said folder document to be located in said plurality of shared libraries;

providing a third phrase by said user at said library server specifying a depth to search within said folder for said document within said plurality of related documents;

combining said first, second and third phrase at said library server to form said single search criteria and executing said single search criteria at said plurality of shared libraries to locate said document within said folder; and saving said search result by said library server for use in additional searching at the shared library where said document and said folder are located.

5. A method implemented in a document interchange management system of saving a search criteria as recited in claim 4, wherein said search result and said single search criteria are saved together by said file server in a second folder.

* * * * *